Figure 1:
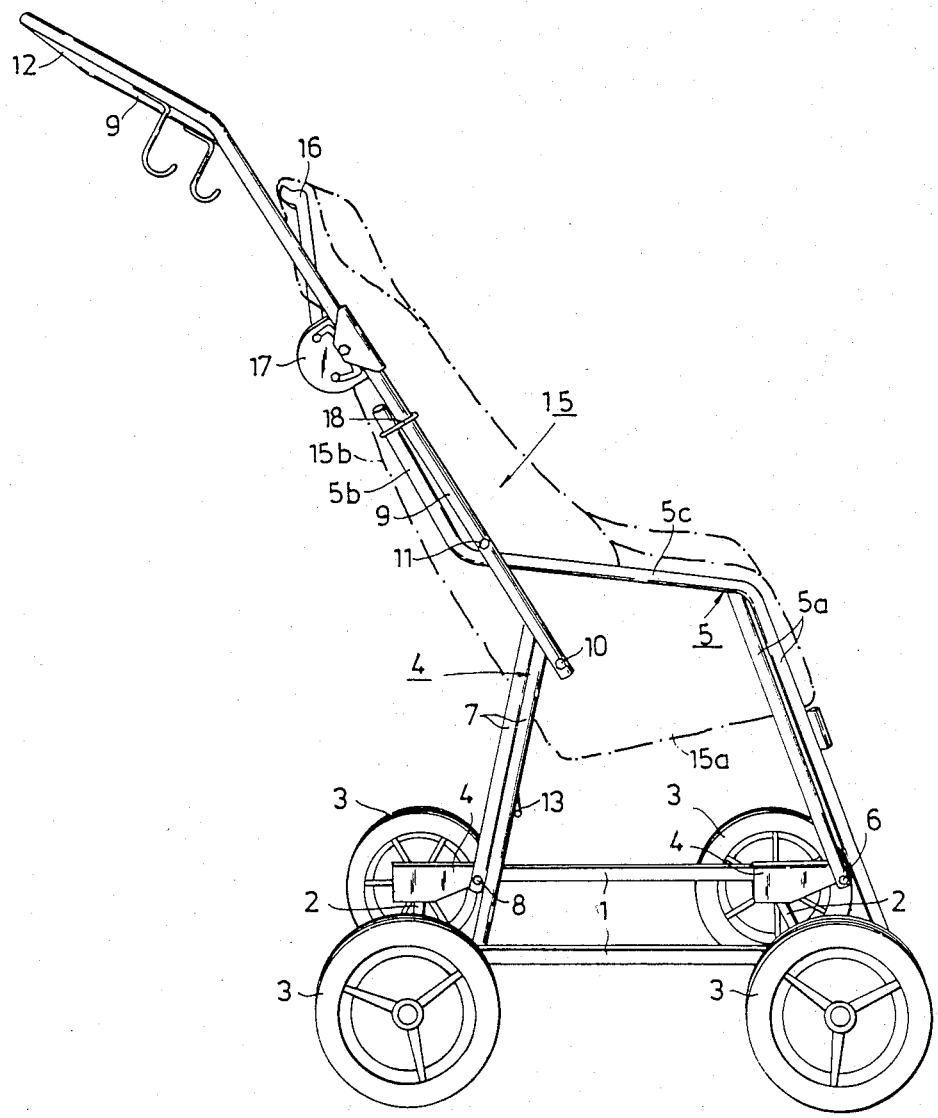

United States Patent [19]

Alldén

[11] Patent Number: 4,506,906
[45] Date of Patent: Mar. 26, 1985

[54] COLLAPSIBLE STROLLER
[75] Inventor: Per O. Alldén, Växjö, Sweden
[73] Assignee: Alvema Rehab AB, Alvesta, Sweden
[21] Appl. No.: 485,377
[22] Filed: Apr. 18, 1983
[30] Foreign Application Priority Data Apr. 28, 1982 [SE] Sweden ............... 8202658

[51] Int. Cl.³ ............................... B62B 11/00
[52] U.S. Cl. .................. 280/642; 280/650; 280/47.4
[58] Field of Search ........... 280/641, 642, , 644, 280/42, 647, 650, 47.34, 47.37 R, 47.38

[56] References Cited

U.S. PATENT DOCUMENTS

| | | | |
|---|---|---|---|
| 2,951,708 | 9/1960 | Kujala | 280/642 |
| 3,561,787 | 2/1971 | Toda et al. | 280/642 |
| 4,293,144 | 10/1981 | Ida | 280/650 X |
| 4,324,410 | 4/1982 | Perego | 280/650 X |
| 4,378,946 | 4/1983 | Voytko et al. | 280/642 |

Primary Examiner—Joseph F. Peters, Jr.
Assistant Examiner—Michael Mar
Attorney, Agent, or Firm—Browdy and Neimark

[57] ABSTRACT

The invention relates to a collapsible wheelchair or carriage of the stroller type, particularly for handicapped children. The carriage has a rectangular, rigid under-frame, formed by two side members (1) with wheeled axles (2) joining the members, which also support a superstructure (5, 7, 9). The superstructure is collapsible from an erected position of use to a folded position adjacent the underframe, and carries the carriage seat (15), which includes a seat portion (15a) and a back portion (15b) and preferably side pieces as well. The superstructure is self-locking in an erected state, such that it cannot be collapsed under the action of the weight of a person sitting in the seat. The superstructure is also implemented to form armrests or side supports for the seat.

4 Claims, 3 Drawing Figures

COLLAPSIBLE STROLLER

The present invention relates to a collapsible wheeled chair or carriage, particularly for children and of the so-called stroller type. The carriage in accordance with the invention has been developed primarily for handicapped children but can naturally also be used for those without handicap, the construction of the carriage being also utilizable in principle for adult wheelchairs.

A basic problem in the implementation of collapsible stroller-type carriages is to provide a sufficiently stable construction, which should also be self-locking in its erected state, so that the carriage is not unintentionally collapsed by the action of the weight of the person sitting in the carriage, if some locking or latching member should be out of function. Such unintentional collapsing of the carriage can lead to very serious injuries to the person using it. The construction should also be such that it is simple and cheep to manufacture. The type of structures used so far for collapsible strollers or wheelchairs seldom meet these requirements in a satisfactory manner.

The object of the present invention is therefore to provide a collapsible stroller-type carriage which fulfils the requirements mentioned above in a better manner than previously known structures. The characterizing features of the carriage in accordance with the invention are apparent from the appended claims.

Figure 2:
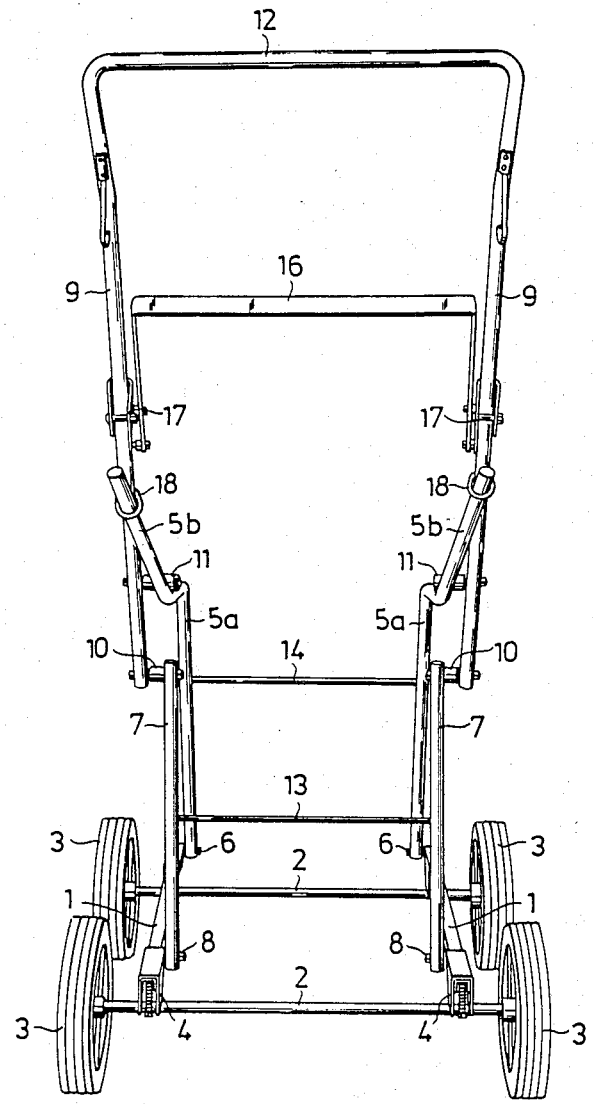
Figure 3:
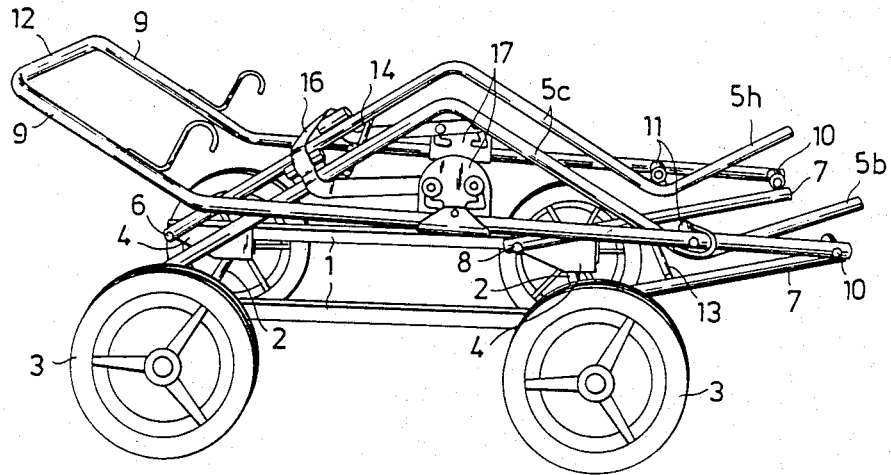

The invention will now be described in detail in the following in conjunction with the accompanying drawing, on which a wheelchair or stroller implemented in accordance with the invention is schematically illustrated as an example, and where FIG. 1 is a perspective side view of the carriage in erected state, with the seat thereof only schematically illustrated with the aid of chain-dotted lines;

FIG. 2 is a perspective view of the carriage seen from behind and with the seat removed for the sake of clarity; and FIG. 3 is a perspective side view of the carriage in a collapsed state, similarly with the seat removed for the sake of clarity.

The stroller carriage or wheelchair in accordance with the invention and illustrated as an example has a rectangular underframe formed by two side members 1 and two axles 2 carrying wheels 3. The axles 2 are united with the side members 1 with the aid of spring means 4, allowing the axles 2 a spring motion in the vertical direction relative the side members 1, but which are so formed that the members 1 together with the axles 2 form a rectangular frame, which is generally rigid in the plane of the frame.

The collapsible superstructure of the carriage, includes two identical sets of articulatedly assembled struts, one on either side of the carriage. There is thus on either side of the carriage a first, substantially S-shaped strut generally denoted by 5 with two generally mutually parallel end portions 5a and 5b with an intermediate portion 5c uniting said portions, the latter forming obtuse angles with both end portions 5a and 5b in the illustrated embodiment. The lower end of the first strut 5 is pivotably attached to the forward end of the associated side member 1 of the under-frame about a horizontal pivoting shaft 6. The strut assembly further includes, on either side of the carriage, a second straight strut 7, pivotably attached at its lower end to the rear part of the side member 1 about a pivoting shaft 8, and has its upper end articulatedly connected to one end of a third strut 9 about a horizontal pivoting shaft 10. This third strut 9 is in turn pivotably connected to the first strut 5 about a horizontal pivoting shaft 11 situated at, or in the vicinity of, the angle between the end portion 5b and intermediate section 5c of the strut 5. The strut 9 is extended in an upward direction and its upper end joined to the corresponding strut 9 on the other side of the carriage with the aid of the carriage handle 12. The other struts 5 and 7 are also joined to the corresponding struts on the other side of the carriage with the aid of cross members 13 and 14, respectively.

The seat 15 of the carriage, only schematically illustrated in FIG. 1, can be manufactured to advantage from textile or plastic fabric, or similar material with possible necessary stiffening in the seat portion 15a and the back portion 15b. The seat is, in any case, implemented such that the seat portion 15a and back portion 15b are articulatedly connected to each other along the back edge of the seat portion 15a and the bottom edge of the back portion 15b. The seat is attached to struts 5 and 9 such that the seat portion 15a is carried by the strut 5, while the back portion 15b is carried by the strut 9. For this purpose there is a yoke 16, carrying the upper edge of the back portion 15, attached between the struts 9 on either side of the carriage. The yoke 16 is attached to the struts 9 with the aid of special attachments 17 enabling adjustment of the yoke 16 in different positions for altering the inclination of the back portion 15. It will be understood that the yoke 16 could also be replaced by a fixed cross member between the struts 9 on either side of the carriage.

In the erected state of the carriage illustrated in FIG. 1, the middle portion 5c of the strut 5 is substantially horizontal and forms an armrest or side support for the seat 15. To advantage, the seat 15 is implemented with whole side pieces, downwardly united with the seat portion 15a along its side edges, and rearwardly united with the back portion 15b along its side edges, while upwardly and forwardly being attached to the intermediate portions 5c and lower portions 5a, respectively, of the struts 5.

In the erected state of the carriage, the connection point 10 between the struts 7 and 9 is situated in front of the connection point 11 between struts 9 and 5 as well as the attachment point 8 of the strut 7 to the side member 1 of the under-frame. Struts 7 and 9 thus form a toggle which must be straightened out and collapsed in the opposite direction for the superstructure of the carriage to be collapsed to the state illustrated in FIG. 3. As will be most clearly seen from FIG. 2, the upper end portions 5b of the strut 5 are obliquely directed to cross and lie behind the strut 9. It will be understood that the superstructure of the carriage will accordingly be self-locking in its erected state, such that it cannot be collapsed under the action of the weight of a person sitting in the seat 15. In order that the superstructure shall be kept locked in its erected state, even against collapse in the intended direction by moving the handle 12 forward, i.e. to the right in FIG. 1, there is a metal ring 18 on either strut 9, and this ring can be pushed over the end 5b of the strut 5 so as to encircle the latter resulting in that the strut 9 and strut 5 are locked to each other.

It will be understood that a carriage implemented in accordance with the invention can be supplemented by further details not illustrated in detail on the drawing, e.g. a footrest attached to the lower portions 5a of the strut 5, a sunshade top and the like.

I claim:

1. A collapsible wheelchair comprising a rectangular under-frame including two mutually parallel side members and two mutually parallel wheeled axles extending at right angles to said side members and joining the same; a collapsible superstructure supported by said under-frame; and a seat supported by said superstructure and including a seat portion and a back portion articulatedly attached to each other; said collapsible superstructure including, on either side of the carriage, a first, substantially S-shaped strut having two, mutually substantially parallel end portions and an intermediate portion therebetween and having one end connected pivotably about a horizontal pivot axis to the associated side member at the forward end thereof, a second strut having one end connected pivotably about a horizontal pivot axis to said associated side member at the rear end thereof and the opposite end connected pivotably about a horizontal pivot axis to one end of a third strut, said third strut being connected at some distance from its said one end pivotably about a horizontal pivot axis to said first strut substantially at the angle between the intermediate portion and the upper end portion of said first strut, in such a manner that in the erect state of the superstructure the connection point between said second and said third struts is located in front of the connection point between said first and said third struts as well as in front of the connection point of said second strut to said associated side member, said third strut and said upper end portion of said first strut extending, in the erected state of the superstructure, contiguously upwards from their mutual connection point with the upper end portion of said first strut located behind and crossing said third strut, whereby the superstructure is prevented from collapsing under the weight of a person sitting in said seat, the seat being attached to said first and said third struts with said seat portion supported by said first strut and said back portion supported by said third strut on either side of the connection point between said first and said third struts.

2. A wheelchair as claimed in claim 1, wherein the intermediate portion of said first strut is substantially horizontal in the erected state of the superstructure, and forms an armrest for said seat.

3. A wheelchair as claimed in claim 1, wherein said third strut is located laterally outside of said first strut as well as said second strut at its connection points to said first and second struts.

4. A wheelchair as claimed in claim 1, comprising a locking means in the form of a ring surrounding said third strut and displaceable along it, above its connection point with said first strut, such that said ring can be slid over the continuous upper end portion of said first strut for surrounding also said first strut and thereby rigidly locking said third and first struts to each other, when the superstructure is in its erect state.

* * * * *